May 19, 1959

J. C. LEE 2,887,185

TRUCK SAFETY BRAKING MEANS

Filed Dec. 26, 1956

INVENTOR.
JACK C. LEE
BY
ATTORNEY

United States Patent Office

2,887,185
Patented May 19, 1959

2,887,185

TRUCK SAFETY BRAKING MEANS

Jack C. Lee, Arcadia, Calif.

Application December 26, 1956, Serial No. 630,609

8 Claims. (Cl. 188—4)

The present invention relates to vehicle brakes in general and particularly to auxiliary truck braking means adapted to be called into use when the conventional brakes have failed. More specifically, the invention comprises auxiliary braking means for heavy-duty trucks and trailers normally held in reserve and not used, but adapted to be placed in use when necessary after the conventional brakes of the truck or trailer have failed.

In many parts of the United States and particularly in the west in the mountains there are long grades on which the brakes of heavy trucks and trailers frequently burn out and fail. When such failure occurs the driver is without means to slow or stop his vehicle and frequently disaster results with loss of equipment and lives. Due to the masses involved, the high speed at which trucks and trailers travel today and the danger involved in such vehicles running out of control, in certain parts of the west on long down-grades safety or escape ramps have been provided onto which a runaway truck and trailer can be guided to bring it to a stop on an upgrade which leads nowhere. Even though the size and effectiveness of the conventional brakes on the trucks and trailers can be increased to provide a greater factor of safety, the danger of burn-out and failure under certain conditions would be present. The present invention is intended to take care of this hazard through providing auxiliary braking means which are never used except in cases of emergency in which the conventional brakes have failed. The unit is simple in construction and may be stored in inoperative position in which it does not interfere with the working of the conventional parts of the truck or trailer unit.

With an appreciation of the problems present in the field, it is an object of the present invention to provide new and improved auxiliary safety braking means for trucks and trailers which are at all times ready for use but which are intended to be placed in use only when the conventional brakes have failed.

A further object of the invention is to provide a new and improved auxiliary safety braking means for trucks and trailers in which normally inoperative braking skids are released to operative position when required and then function to support certain of the wheels of the vehicle and to brake without supporting others of the supporting wheels.

These and other more specific objects will appear upon reading the following specification and claims, and upon considering in connection therewith the drawing attached thereto.

Referring now to the drawing in which a preferred embodiment of the invention is disclosed:

Figure 1:
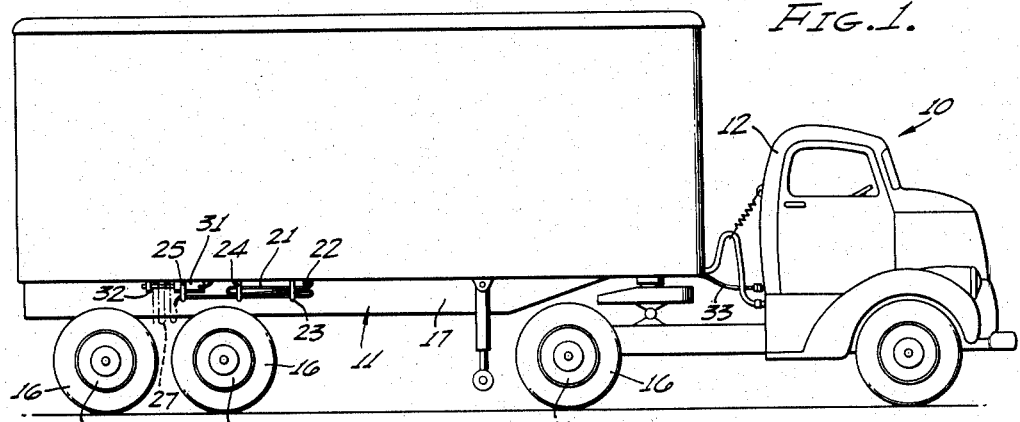
Figure 1 illustrates a truck and trailer unit in which auxiliary safety braking means constructed in accordance with the present invention have been incorporated.

Referring again to the drawing, a truck is illustrated and is indicated generally by the reference character 10. The detachably connected trailer which it pulls is indicated by the reference character 11. Truck 10 and trailer 11 are provided with conventional brakes, the brakes for the truck 10 being at the rear wheels 13 and the brakes for the trailer at its rear wheels 14 and 15. Only one side of the truck and trailer is shown but it is to be understood that the opposite unshown side substantially duplicates the illustrated side. Each of the wheels carries heavy-duty tires 16 and the mounting of the wheels upon the frame 17 of the trailer 11 is conventional. Suitable operator-controlled means connect the brakes to the cab 12 so that the driver can exercise control as desired.

Figure 4:
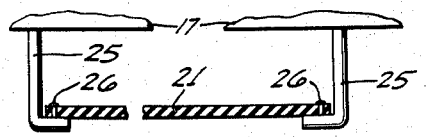
Figure 4 is a vertical section upon the line 4—4 of Figure 2.

As is shown most clearly in Figure 2, an elongated flap or skid 21 is carried below the body 20 of the trailer, its forward end being attached to a fixed bracket 22. Flap 21 is folded, the individual runs extending forwardly and rearwardly, and is supported by spaced pairs of depending bracket arms 23, 24 and 25. Brackets 25 are most clearly shown in Figure 4. Each of the bracket arms 23, 24 and 25 has an inwardly extending horizontal portion which underlies the edge of the flap 21 sufficiently to support it, the flap being relatively stiff and inflexible. As a matter of fact, the pairs of forward bracket arms 24 and 23 may be made as integral one-piece units if desired, but the rearward bracket arms 25 must be spaced apart with the inner ends of their horizontal extensions spaced apart. For the purpose of insuring that the flap 21 will not be unintentionally displaced from the bracket arms 25, small securing pins 26 are used which pass through the flap into the horizontal extensions of the arms. These pins are adapted to be broken off under an extraordinarily strong pull exerted on the flap, but their strength is sufficient to insure the retention of the flap in position under all other conditions. Similar pins may also be used on the pairs of arms 23 and 24, although such pins will not, of course, be required if each of those pairs are made integral.

Figure 2:
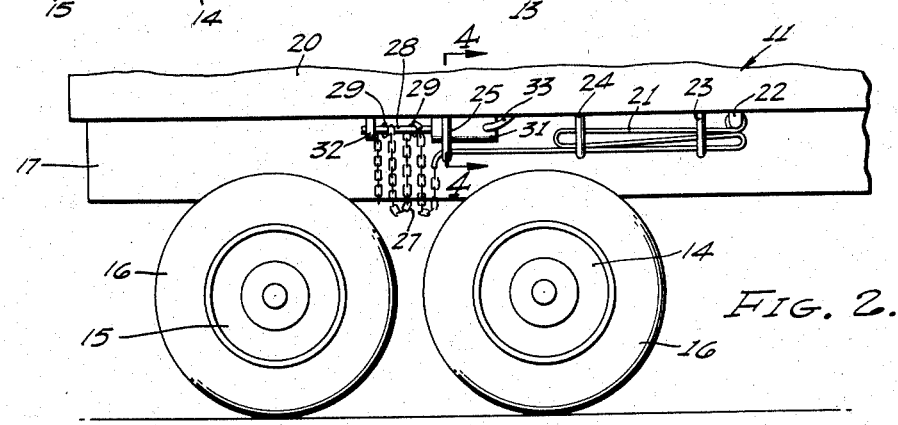
Figure 2 is an enlarged showing of the rear wheels and adjacent body of the trailer showing more clearly the auxiliary braking means in their normal inoperative storage position.
Figure 3:
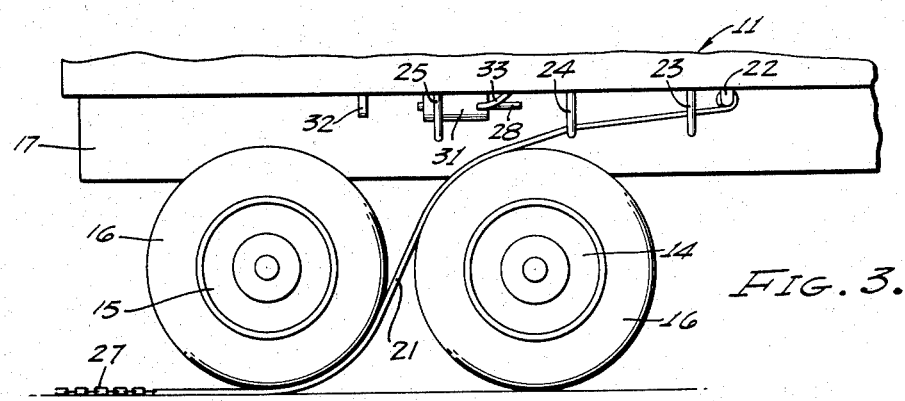
Figure 3 is a view similar to Figure 2 but with the auxiliary braking means in operative braking position.

In stored position flap 21 extends horizontally as illustrated and after passing through the supporting horizontal extensions of the rearmost bracket arms 25 connects to an elongated chain 27 which normally, in the manner shown most clearly in Figure 2, is supported by a horizontal rack rod 28. The chain is provided at spaced points with rings 29 through which the rod extends. Rod 28 is movable and its forward end is connected to an unshown armature of an electrical solenoid 31, its rearward end being supported in still another downwardly depending bracket 32. Solenoid 31 is connected by an electrical conduit 33 to control means in the cab 12, and upon being energized is adapted to displace the rod 28 from its rearward chain-supporting position shown in Figure 2 to a retracted forward chain-releasing position shown in Figure 3. In normal storage position, however, the chain is supported by the rod 28 as illustrated in Figure 2 and the flap 21 by the bracket arms 23, 24 and 25 as shown in the same figure, and the entire device being inoperative and merely awaiting its call to duty.

The safety braking means comprising the present invention is used only when the conventional brakes at the wheels 13, 14 and 15 fail. In such an event the driver in the cab 12 energizes the electrical solenoid 31 causing the rod 28 to be moved forwardly from its position shown in Figure 2 to the position shown in Figure 3. This movement displaces the rod from the circular links 29 of the chain and the latter drops downwardly between the wheels 14 and 15 where it is run over by the rear wheel 15. As it travels under wheel 15, chain 27 pulls flap 21 downwardly and between the horizontal extensions of rearmost bracket arms 25 breaking the holding pins 26 and simultaneously drawing the folds of the flap from between the bracket arms 23 and 24. The tire 16 on rear wheel 15 rides on to flap 21 and is supported by it on the roadway. The friction between the flap and the pavement exerts a tremendous force drawing the flap rearwardly, which force tends to straighten it between the bracket arms 24 and the point of contact with the rear wheel 15. This results in the flap being drawn downwardly against the tire 16 of wheel 14 where it exerts a frictional braking force. A double braking action results, one in which at the wheel 14 the braking action takes place between the tire 16 and the flap 21 while at the wheel 15 it takes place between the flap and the underlying roadway. The retention of the forward wheel 14 in rolling contact with the roadway provides greater stability and there is less danger of jackknifing the truck and trailer.

The flap 21 is preferably made of heavy, brake-band type material which can withstand the terrific heat and pressure generated in the braking operation and in preferred forms may well include internal steel cables to provide additional strength. The exact construction of the flap is not of the essence so long as it can perform the intended function and withstand the heat generated and the pressure exerted.

While the invention has been disclosed and described in connection with a vehicle having only two rear wheels on a side, it is to be understood that the disclosure is illustrative only and that where multiple rear wheels are provided on each axle on each side of the vehicle the invention is operative in the same manner, the flap 21 riding under each of the trailing wheels on the rearmost axle and contacting the tires of the leading wheels on the forward axle. The control means by which the invention is placed in operation also is not critical and instead of the electrically-operated solenoid 31 any suitable mechanically equivalent means can be provided which will be effective to release chain 27 and permit it to fall under the rear wheels when required.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Auxiliary safety braking means for a vehicle of the type having pairs of rear supporting wheels closely spaced to one another longitudinally of the vehicle supported, said means comprising a braking flap stored beneath said vehicle and above the leading wheel of one of said pairs of wheels and connected to said vehicle at a point forwardly of the axle of said leading wheel, the rearward extension of said flap in stored position terminating at a point between said wheels, and means normally supporting said flap in stored position from which the rearmost portion of the flap is adapted to be dropped onto the road in the path of the rear wheel and rearwardly of the forward wheel whereby said rear wheel runs onto said rearmost portion of the flap to provide highly effective braking thereof as forward portions of the flap are drawn into taut frictional contact with the periphery of the leading wheel of said pairs of wheels.

2. In an ambulatory vehicle of the type having rear supporting wheels closely spaced to one another longitudinally of the vehicle, a brake flap having one end connected to the body of said vehicle at a point forwardly of the axle of the forward one of said pair of wheels, means to support said flap in a retracted stored position out of contact with said wheels and including retaining means adapted to be displaced to permit the free end of said flap to fall between said wheels and under the trailing wheel of said pair of wheels in the travel of the vehicle, said flap being of sufficient length and so positioned relative to said closely spaced rear wheels as to extend simultaneously into taut frictional contact with the upper surface of the leading wheel of said pair of wheels and under the trailing wheel of said pair of wheels.

3. In combination with an ambulatory vehicle the sides having closely spaced pairs of supporting wheels at one end thereof, a braking flap having one end secured to the body of said vehicle forwardly of the leading wheel of one of said pairs and having a length sufficient to extend over said leading wheel, downwardly between said wheels, and under the trailing one of said wheels, a chain connected to the rearward free end of said brake flap, supporting means normally retaining said flap and said chain in stored position above and between the wheels, and operator-controlled means to release said chain and the free end of said flap to fall into the path of said trailing wheel whereby the running of the wheel onto said chain is effective to draw said flap downwardly and under said trailing wheel and into frictional engagement with the upper rear quadrant of the leading wheel in which position said brake flap supports the trailing wheel above the roadway being traveled and is drawn by the friction with the roadway into braking contact with the surface of said leading wheel.

4. The construction recited in claim 3 characterized in that said chain is provided with a plurality of spaced links and in that said supporting means for said chain includes a movable element extended through said links, and means to displace said element from supporting position under the control of the operator.

5. In a road vehicle of the type having closely spaced tandem wheels at one end thereof, that improvement which comprises an emergency brake for use in arresting forward movement of the vehicle and formed by a high strength elongated braking flap having one end anchored to the vehicle adjacent the forward one of said wheels, means for storing said flap normally in a retracted position out of contact with said wheels with the free end in position when released to be run onto by the rear one of said wheels, said released flap being so positioned relative to said wheels that the advance of the rear wheel thereover is effective to wrap a leading portion thereof into taut frictional contact with the upper rear quadrant of the leading wheel and with the lower forward quadrant of the trailing wheel to aid in braking the advance of said vehicle.

6. The invention defined in claim 5 characterized in that the free end of said braking flap is formed by interlinking metal elements.

7. The invention defined in claim 5 characterized in the provision of electro-mechanical means for normally locking said braking flap in stored position, and operator controlled means for effecting the release of said locking means and for releasing the free end of the flap onto the roadway in the path of the rear wheel.

8. The invention defined in claim 6 characterized in that said inter-linking metal elements include a ring, and said means for normally holding said braking flap stored in retracted position includes retractable means extending through said ring for holding the flap positively in its stored position until deliberately released by the vehicle operator.

References Cited in the file of this patent

UNITED STATES PATENTS

| | | |
|---|---|---|
| 2,252,878 | Bella et al. | Aug. 19, 1941 |
| 2,746,570 | Stahmer | May 22, 1956 |